Figure 1:
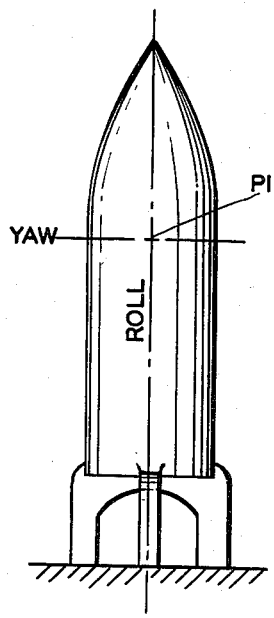

June 20, 1961

S. M. WALDOW 2,989,270

FLIGHT PATH PROGRAMMING SYSTEM

Filed May 7, 1956

INVENTOR.
SHELDON M. WALDOW
BY
Oscar B Brumback
ATTORNEY

United States Patent Office 2,989,270
Patented June 20, 1961

2,989,270
FLIGHT PATH PROGRAMMING SYSTEM
Sheldon M. Waldow, Fort Lee, N.J., assignor to The Bendix Corporation, a corporation of Delaware
Filed May 7, 1956, Ser. No. 583,186
9 Claims. (Cl. 244—14)

The present invention relates generally to control systems and more particularly to a system for programming the path in space of a movable body.

Prior to launching, a movable body such as a rocket or missile may have one attitude relative to the earth's surface, for example, an attitude perpendicular to the earth's surface; and after launching, the body may assume another attitude, such as an attitude oblique to or parallel to the earth's surface. The attitude, after launching, may be a constantly changing attitude.

The rotation of the body axis may be measured by an inertia member which remains fixed in its position with respect to space regardless of the rotation of the missile axes. The axis of the inertia member being fixed with respect to space, therefore changes with respect to the axis of the earth as the missile traverses the earth. The changes in relationship of the axes of the inertia member and the axis of the earth are a function of latitude and longitude of the earth and may be computed as a function of the missile travel from an initial position.

An object of the present invention, therefore is to provide a novel arrangement for programming the attitude of a movable body.

Another object is to provide a novel means for computing the relationship of a missile reference to an earth reference.

Still another object is to provide a novel device for programming the pitch attitude of a dirigible craft.

A further object is to provide a novel device which will compute the normal vertical reference to which the pitch attitude of the movable body is to be programmed.

A still further object is to provide a novel system for developing yaw, pitch and roll correction signals for a missile control system.

The present invention contemplates a means for measuring the rotation of a missile with respect to a fixed inertia member so as to program a desired rotation between the missile and the inertia member and develop an output corresponding to the error between the measured and programmed rotation.

The foregoing and other objects and advantages of the invention will appear more fully hereinafter from a consideration of the detailed description which follows, taken together with the accompanying single sheet of drawing wherein one embodiment of the invention is illustrated. It is to be expressly understood, however, that the drawing is for the purposes of illustration and description, and is not to be construed as defining the limits of the invention.

Figure 2:
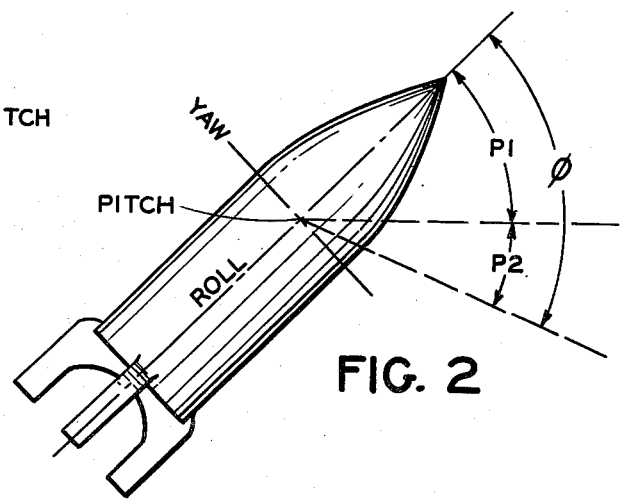
Figure 3:
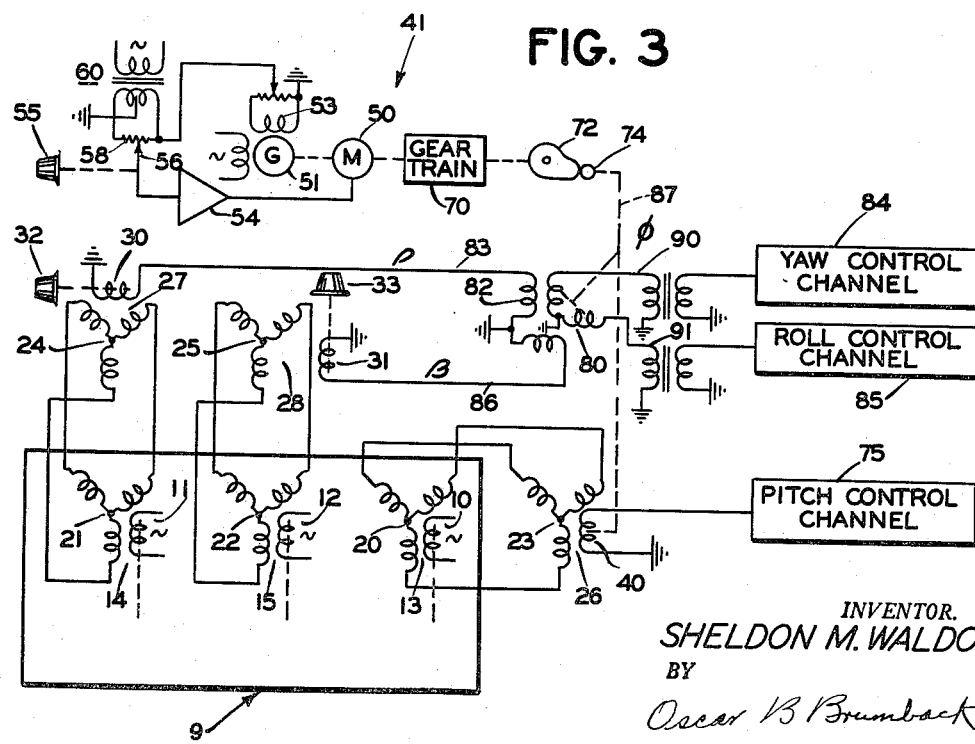

FIGURE 1 diagrammatically illustrates the various body axes of a missile at the time of launching;

FIGURE 2 diagrammatically illustrates the various body axes of a missile after launching; and FIGURE 3 schematically illustrates an embodiment of the novel invention incorporated in the control system of a guided missile.

It will be noted from FIGURE 1 that if the fore and aft or roll axis of the missile is perpendicular to the earth's surface at the time of launching, the yaw and pitch axes are parallel to the earth's surface, and, from FIGURE 2, that if the pitch axis is maintained parallel to the earth's surface, the yaw and roll axes become oblique to the earth's surface as the missile is programmed about the pitch axis. Since inertia member 9 remains fixed in its position with respect to space regardless of the movements of the missile, the relationship between the missile axes and the inertia member axes changes after the missile is launched, and the relationship of the axes of the inertia member changes with respect to the axis of earth's as the missile travels over the earth's surface.

The relationship of the instantaneous horizon to the axis of the inertia member may be computed from the following equation:

$$\sin P_2 = \cos \lambda \sin (K_0 - K - \omega_0 t)$$

where $P_2$=pitch
$\lambda$=latitude
$K_0$=initial longitude
$K$=inst. longitude
$\omega_0$=earth's path of rotation
$t$=time Turning now to FIGURE 3, the inertia member may be a conventional stable platform 9, functioning as an inertia member for providing yaw, roll and pitch deviations of the missile relative to the platform. The rotors 10, 11 and 12 of respective inductive devices 13, 14 and 15 are connected in a known manner to the platform and respective stators 20, 21, and 22 are fixed to the missile so as to measure displacements of the missile with respect to the platform in pitch, roll and yaw. Each stator is connected in parallel to another stator 23, 24, and 25 of respective inductive devices 26, 27, and 28 to provide conventional transmitter-receiver arrangements. As is well known in transmitter-receiver arrangements, no output is developed at the receiver rotor as long as the transmitter and receiver rotors are in a null or position of agreement. However, upon movement of one of the rotors from the null position, an output is developed at the receiver rotor.

By way of controller knobs 32 and 33, the rotors 30 and 31 of receiver inductive devices 27 and 28 may be nulled or zeroed relative to stators 24 and 24 at the initial position of the missile to prevent sustained rotations in roll or yaw relative to the platform axis. The rotor 40 of inductive receiver device 26 is positioned by the novel programmer 41 of the present invention.

The novel programmer 41 comprises a conventional induction motor 50 driving a conventional rate generator 51 to develop at winding 53 an output signal corresponding to the rate of rotation of the motor. This signal is fed back to a conventional amplifier 54 to control the rate of motor operation. The rate at which the motor operates is preset by turning knob 55 and positioning wiper 56 on a potentiometer 58 which is energized from a suitable source by way of a center tapped power transformer 60. The output from wiper 56 is applied to amplifier 54 which operates motor 50 at a rate proportional to the displacement of wiper 56 from a center position on potentiometer 58; for each position of wiper 56, motor 50 operates at a predetermined constant rate.

The output shaft of motor 50 through a suitable gear train 70 drives a cam 72 which positions a follower 74 whose output shaft displaces rotor 40 of inductive device 26 relative to stator 23. The position of rotor 40 with respect to stator 23 thus is a function of time during which motor 50 operates and the rate of motor operation. The output developed at rotor 40 is applied to a conventional pitch control channel 75 which controls the attitude of the missile about the pitch axis to reduce the output to zero, i.e., when the pitch attitude has been changed so that the position of stator 20 which is fixed to the craft and rotor 10 which is fixed with the inertia member, bears the same relationship as the rotor 40 to stator 23.

The pitch attitude of the craft according to the present invention is the programmed pitch attitude and normally is a desired attitude with respect to the instantaneous horizon. As described before, the movement of the missile over the surface changes the relative position of the inertia member and the earth. This is demonstrated in FIGURE 2 wherein $P_1$ corresponds to the desired pitch attitude of the missile relative to the horizon at the instant position of the missile and $P_2$ is the angle of the pitch axis of the inertia member with respect to the horizontal. The total angle $\phi$ between the inertia member and the craft is the summation of $P_1$ and $P_2$. Cam 72 is suitably shaped to provide an output or a rotation of rotor 40 corresponding to a desired attitude at time T. Since the yaw and roll attitudes of the craft are functions of the pitch attitude, the output of follower 74 positions the rotor 80 of a conventional resolver 82 to develop an output for the yaw control and the roll control channels 84 and 85 of the missile to cause these channels to control the missile so as to reduce the output to zero. Thus if any output appearing at lead 83 be designated $\rho$, any output appearing at lead 86 be designated $\beta$, and the position of shaft 87 be designated $\phi$ since it corresponds to the total angle $\phi$ between the inertia member and the craft; then, the resulting output at lead 90 corresponds to:

$$\rho \cos \phi - \beta \sin \phi$$

and the output at lead 91 corresponds to:

$$\rho \sin \phi - \beta \cos \phi$$

The steering channels 75, 84, and 85 may be of any suitable type and, for example, may include conventional hydraulic servos which operate yaw, roll and pitch control surfaces, and be similar to automatic pilots for aircraft.

In operation, the inertia member is positioned at a true vertical prior to the launching of the craft. Knobs 32 and 30 are turned to zero or null the output of inductive receivers 27 and 28. Wiper 56 is positioned on potentiometer 58 to operate motor 40 at the desired constant speed. Upon launching, the position of cam 72 relative to follower 74 positions rotor 40 of receiver device 41 to program a desired pitch attitude as a function of time of flight of the missile. Rotor 80 of resolver 82 is also displaced by follower 74 as a function of the time of flight of the missile to control the yaw and roll attitudes of the missile.

The foregoing has presented a novel system for programming the desired attitude of a missile as a function of the time of flight of the missile. The system takes into account the initial latitude and longitude of the craft. The system further computes the instant horizontal from the operational position of the inertia member.

Although but one embodiment of the invention has been illustrated and described, various changes can be made in the design and arrangement of the parts, without departing from the spirit and scope of the invention, as the same will now be understood by those skilled in the art.

What is claimed:

1. A device for computing the flight path of a movable body comprising an inertia member on said body, said member being inherently subject to appearing to drift with respect to the earth due to the horizontal velocity of the body and the rotation of the earth as a function of the instantaneous latitude and longitude, means for measuring the displacement between said body and said member, means for programming a desired displacement between said body and said inertia member as a function of time and taking into account said apparent drift, said means including a cam contoured according to the desired displacement and driven at constant speed and means for developing an output corresponding to the difference between the measured and desired displacement.

2. A device for computing the flight path of a body comprising an inertia member on said body inherently subject to drift with respect to the earth due to horizontal velocity of the body and rotation of the earth as a function of the instantaneous latitude and longitude, means for measuring the displacement of said body in pitch relative to said member, means for measuring the displacement of said body in yaw relative to said member, means for measuring the displacement of said body in roll relative to said member, means for developing an output corresponding to the error between the measured displacement in pitch and a desired displacement, means developing a second output corresponding to the measured yaw displacement; means for developing a third output corresponding to the measured roll displacement, and means for modifying said second and third outputs as a function of the desired pitch displacement to correct for drift of the inertia member.

3. A device for computing the flight path of a body comprising an inertia member on said body inherently subject to drift with respect to the earth due to horizontal velocity of the body and rotation of the earth as a function of the instantaneous latitude and longitude, means for measuring the displacement of said body in pitch relative to said member, means for measuring the displacement of said body in yaw relative to said member, means for measuring the displacement of said body in roll relative to said member, means for developing an output corresponding to the error between the measured displacement in pitch and a desired displacement, means developing a second output corresponding to the measured yaw displacement; means for developing a third output corresponding to the measured roll displacement, and means for modifying said second and third outputs as a function of the desired pitch displacement to correct for drift of the inertia member, and means under the control of said output to actuate said body so as to reduce said outputs to zero.

4. A device for computing the flight path of a body comprising an inertia member on said body, signal means having first and second parts for developing a signal upon relative movement of said parts, means for moving said first part by said member, and means on said body for programming a movement of said second part including a motor, means providing a preset input for said motor, a rate generator driven by said motor for providing a second input for said motor in opposition to said preset input whereby said motor operates at a rate corresponding to said preset input, and cam and follower means connecting said motor movement of said second part, whereby the signal developed by said signal means corresponding to the difference between the movement of said body and the movement programmed for said body.

5. A device for computing the flight path of a body having pitch, roll and yaw axes, comprising an inertia member on said body inherently subject to drift with respect to the earth due to horizontal velocity of the body and rotation of the earth as a function of the instantaneous latitude and longitude, means for developing a control effect corresponding to the difference between a desired displacement of said body relative to said member about said pitch axis, means for developing a second control effect corresponding to the displacement of said body relative to said member about the yaw axis, means for developing a third control effect corresponding to the displacement of said body relative to said member about the roll axis, and means for modifying said second and third control effects as a trigonometric function of the desired displacement of said body in pitch relative to said member to correct for drift of the inertia member.

6. A device for computing the flight path of a body, comprising an inertia member on the body inherently subject to drift with respect to the earth due to horizontal velocity of the body and rotation of the earth as a function of instantaneous latitude and longitude, means for providing first, second and third outputs corresponding to the position of the craft about its pitch, yaw and roll axes relative to the member, means for programming a desired rotation of the body about its pitch axis by modifying the first output, and means for modifying the second and third outputs as a function of the desired pitch rotation to correct for drift of the inertia member.

7. A device for computing the flight path of a body, comprising an inertia member on the body inherently subject to drift with respect to the earth due to horizontal velocity of the body and rotation of the earth as a function of instantaneous latitude and longitude, means for providing first, second and third outputs corresponding to the position of the craft about its pitch, yaw and roll axes relative to the member, means for programming a desired rotation of the body about its pitch axis as a function of time by modifying the first output, and means for modifying the second and third outputs as a function of the desired pitch rotation to correct for drift of the inertia member.

8. A device for computing the flight path of a body, comprising an inertia member on the body inherently subject to drift with respect to the earth due to horizontal velocity of the body and rotation of the earth as a function of instantaneous latitude and longitude, means for measuring the displacement of the body in pitch relative to the member, means for measuring the displacement of the body in yaw relative to the member, means for measuring the displacement of the body in roll relative to the member, means for developing a first output corresponding to the measured pitch displacement, means for developing a second output corresponding to the measured yaw displacement, means for developing a third output corresponding to the measured roll displacement, means for programming a desired displacement of the body about the pitch axis relative to the member by modifying the first output, and means for modifying the second and third outputs as a function of the desired pitch displacement to correct for drift of the inertia member.

9. A device for controlling the flight path of a body, comprising an inertia member on the body inherently subject to drift with respect to the earth due to horizontal velocity of the body and rotation of the earth as a function of instantaneous latitude and longitude, means for providing first, second and third outputs corresponding to the position of the craft about its pitch, yaw and roll axes relative to the member, means for programming a desired rotation of the body about its pitch axis by modifying the first output, means for modifying the second and third outputs as a function of the desired pitch rotation to correct for drift of the inertia member, and means for controlling the body about its pitch, yaw and roll axes in accordance with the modified outputs.

References Cited in the file of this patent

UNITED STATES PATENTS

| | | |
|---|---|---|
| 1,384,559 | Giles et al. | July 12, 1921 |
| 2,109,283 | Boykow | Feb. 22, 1938 |
| 2,381,478 | Zukor | Aug. 7, 1945 |
| 2,492,148 | Herbold | Dec. 22, 1949 |
| 2,762,123 | Schultz | Sept. 11, 1956 |

OTHER REFERENCES

"Computers," Litman, B., Aviation Age, November 1954, pp. 24–31.

"The Gyroscope Applied," Richardson, Philosophical Library Inc., 1954, pp. 352–356.